Patented Nov. 1, 1932

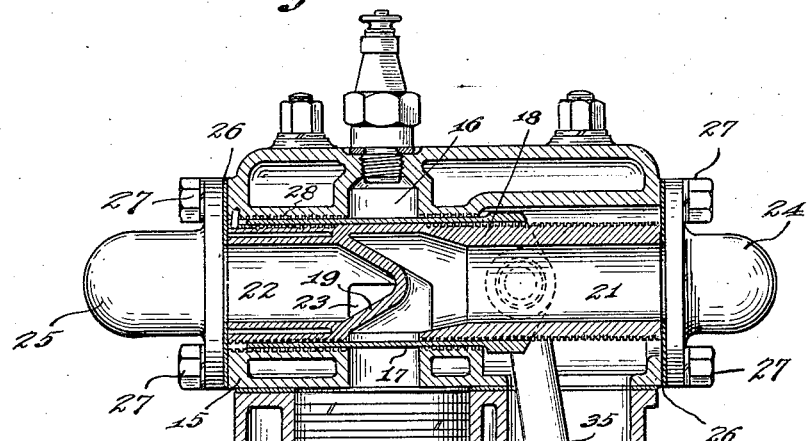

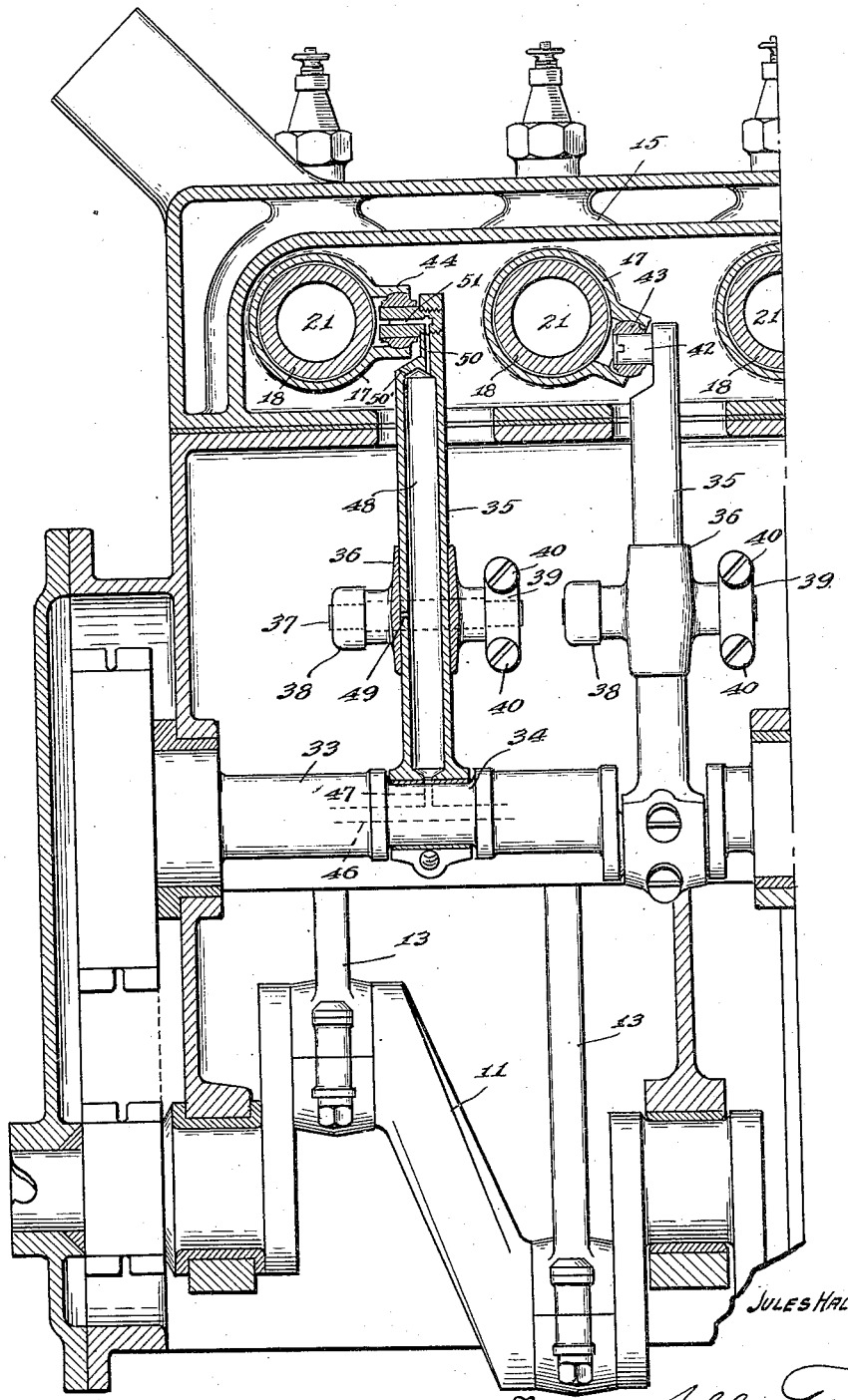

1,885,911

UNITED STATES PATENT OFFICE

JULES HALTENBERGER, OF INDIANAPOLIS, INDIANA, ASSIGNOR, BY MESNE ASSIGNMENTS, TO JOSEPH C. SCHAF, JR., OF INDIANAPOLIS, INDIANA

SLEEVE-VALVE ENGINE

Application filed March 30, 1928, Serial No. 265,935. Renewed March 14, 1932.

It is the object of my invention to produce an internal combustion engine of the sleeve-valve type, particularly of that type in which the sleeve-valve is not concentric with the piston. Among the more specific objects of my invention are to provide a sleeve-valve driving mechanism which will be effectvie to impart to the sleeve-valve a combined axial reciprocation and circumferential oscillation and which will have adequately extensive bearing surfaces; to produce an engine in which the time necessary to effect "wearing-in" of the sleeve-valve will be materially shortened and in which slight inaccuracies in the sleeve-valve and in the parts against which it bears will not constitute a serious difficulty in engine operation; and to provide for supporting within the sleeve-valve a core having exhaust and/or inlet passages in such a manner that the necessity for great accuracy in obtaining exact concentricity of the core and sleeve-valve will be eliminated. A further object of my invention is to permit the removal of a sleeve or any and all sleeves from the engine for inspection or replacement purposes without necessitating the removal of the engine itself nor its cylinder nor the cylinder head.

I accomplish the above object by driving the sleeve-valve from an eccentric on a valve-operating shaft, this eccentric being connected to the sleeve-valve by a connecting rod slidably attached to the sleeve-valve through a universal connection to provide for circumferential oscillation of the sleeve-valve; by providing upon the bearing surfaces either of the sleeve-valve or of the parts against which it bears, a plurality of small serrations or annular grooves which leave between them lands forming the effective bearing surfaces; and by holding the core in place within the sleeve-valve by clamping it axially between two parts, the mating surfaces of such parts and the core having plane faces transverse to the core in order that the clamping means will not interfere with such lateral movement of the core as may be necessary to bring it into exact concentricity with the sleeve-valve.

The accompanying drawings illustrate my invention: Fig. 1 is a transverse section through one of the cylinders of a multi-cylinder internal combustion engine embodying my invention; Fig. 2 is a side elevation in partial section showing details of the valve-driving machanism; Fig. 3 is a fragmental section of the sleeve-valve, similar to Fig. 1, but illustrating a different arrangement of the serrations; and Fig. 4 is another section illustrating a modified form of serration.

An engine embodying my invention has the usual cylinders 10, crank shaft 11, pistons 12, and connecting rods 13. The engine is provided with a cylinder head 15 within which and desirably axially alined respectively with the cylinders are combustion chambers 16.

The cylinder head 15 has a transverse cylindrical bore in which a sleeve-valve 17 is movably mounted, this bore desirably being so located that the sleeve-valve extends through the combustion chamber 16 for reasons set forth in my Patent 1,843,672, Feb. 2, 1932.

Located within the sleeve-valve is a hollow cylindrical core 18 having in the vicinity of the combustion chamber 16 a partition 19 of irregular shape and adapted to divide the interior of the core into an inlet passage 21 and an exhaust passage 22. Extending through the wall of the core are ports 23 which co-operate with ports in the sleeve-valve to control the admission and discharge of gases to and from the combustion chamber 16.

Located on opposite sides of the cylinder head 15 and communicating respectively with the inlet passage 21 and exhaust passages 22 in the core 18, are an inlet manifold 24 and an exhaust manifold 25. Desirably, there is interposed between each of said manifolds and the adjacent face of the cylinder head and end face of the core, a gasket 26. The end surface of the core 18 and the adjacent surfaces of the manifold 24 and 25 are plane and transverse to the axis of the core, for reasons which will appear hereinafter. Screws 27 serve to hold the manifolds in place on the cylinder head and also to clamp the cores 18 between the two manifolds.

The sleeve valve or the parts against which it bears are desirably provided with a series of serrations 28. In the structure as illustrated in Fig. 1, these serrations are provided in the wall of the bore in the head 15 and on the outer surface of the core 18, both the inner and outer surfaces of the sleeve valve being continuous and unserrated. In the modification illustrated in Fig. 3, the walls of the bore in the head 15 are made continuous, and serrations are provided in the exterior surface of the sleeve valve 17. The inner surface of the sleeve 17 is continuous and the outer surface of the core 18 is serrated as shown in the structure illustrated in Fig. 1. Whichever arrangement of serrations is provided, there are no serrations in the outer surface of the core in the vicinity of the port 23, for the presence of serrations in that location would destroy the necessary seal between ports.

The exact form of the serrations which are provided may be varied as desired. In Figs. 1 and 3 they are shown as consisting in grooves of rectangular cross-section and in Fig. 4 as in V-shaped grooves. In either case a narrow land is left between adjacent grooves.

To prevent rotation of the core, it may be provided in one end with a groove 30 adapted to receive a pin 31 which projects inwardly from the wall of the bore in the head 15.

Motion is imparted to the sleeve valve 17 by a valve-operating shaft 33 which extends parallel to the crankshaft 11 and is driven thereby. For each cylinder, the valve-operating shaft is provided with an eccentric 34 which is connected to the associated sleeve valve 17 by means of a connecting rod 35. Each of the connecting rods 35 is slidably received in a guide block 36 which is pivotally mounted on the side of the engine. This pivotal mounting is desirably effected by means of a pivot pin 37 held in place by two brackets 38 and 39. One of the brackets, here shown as bracket 38, may be integral with the cylinder block, while the other bracket, here shown as bracket 39, is removable and adapted to be held in place on the side of the cylinder block by means of screws 40. The pin 37 may be shouldered at both ends as indicated in dotted lines in Fig. 2, to prevent any axial movement.

Near the upper end of each of the connecting rods 35, I provide a laterally extending cylindrical pin 42 upon which there is slidably mounted the ball member 43 of a ball-and-socket joint. The socket 44 of this ball-and-socket joint is carried by the sleeve valve 17 near the outer end thereof. To accomplish insertion and removal of the ball member, it is desirably flattened on opposite sides, as shown in my Patent No. 1,756,684, Apr. 29, 1930.

To provide for lubrication of the valve-operating parts the valve-operating shaft may be provided with a longitudinally extending oil passage 46 which, at each of the eccentrics 34 has an outlet 47 communicating with a longitudinal passage 48 in the associated connecting rod 35. The passage 48 in the connecting rod 35 has three outlets 49, 50, and 50', the first providing a supply of oil to the wearing surfaces of the connecting rod 35 and pivoted guide block 36, and the second communicating with an axial passage 51 in the pin 42 which discharges within the socket 44, and provides for the supply of oil to the inner surface of the sleeve 17. The opening 50' will discharge on the outer surface of the sleeve valve 17.

From the construction described, it will be evident that rotation of the valve-operating shaft 33 will impart to each of the sleeve valves 17 a movement of combined axial reciprocation and circumferential oscillation, this movement of the sleeve valve serving to cover and uncover successively the ports 23 in the core 18. The only angular displacement of the two members of the ball-and-socket joint is that due to the circumferential oscillation of the associated sleeve valve, since movement of each connecting rod 35 is confined to a plane parallel to the sleeve valve axis. This is an important feature of my invention, as such angular displacement reduces the effective bearing area between the ball 43 and its associated socket 44.

The only lateral restraint placed upon the core 18 is that due to its fit within the sleeve valve 17, as the plane end faces of the core and the plane engaging faces of the manifold 24 and 25 make it possible for the core to take that position laterally of itself which is determined by the sleeve valve 17. Thus I eliminate the necessity for excessive accuracy in attaining concentricity of the core and sleeve valve. The serrations 28 reduce materially the bearing area of the sleeve valve 17, and thus make it possible to "wear in" the sleeve in much less time than if said serrations were not provided. The serrations also serve as oil reservoirs and in addition provide pockets in which any foreign matter that might otherwise score the working surfaces may be collected. Further, the mere fact that one of each pair of working surfaces is interrupted tends to prevent scoring.

By the removal of the inlet manifold 24 any and all cores 18 might be removed from their respective sleeves by laterally sliding them out from their positions. After this removal the pin 42 which is screwed in the rod 35 becomes accessible and the unscrewing of the pin 42 by the screw-drive slot provided thereon, the sleeve 17 becomes removable, carrying with it the socket member 44 and the ball member 43, permitting the inspection and replacement of any of these parts. The assembling of the engine might be done in the reverse order stated.

I claim as my invention:—

1. An internal combustion engine, comprising a cylinder having a head, a piston reciprocable in said cylinder, a crankshaft connected to said piston, a sleeve valve mounted in said cylinder head and controlling a port for said cylinder, a valve operating shaft parallel with said crankshaft, an eccentric on said valve shaft, a guide block pivotally mounted on an axis parallel to that of said valve operating shaft, and a connecting rod slidably mounted in said guide block, said connecting rod at one end being connected to said eccentric and at the other end to said sleeve valve through a universal connection.

2. An internal combustion engine, comprising a cylinder having a head, a piston reciprocable in said cylinder, a crankshaft connected to said piston, a sleeve valve mounted in said cylinder head and controlling a port for said cylinder, a valve operating shaft parallel with said crankshaft, an eccentric on said valve shaft, a guide block pivotally mounted on an axis parallel to that of said valve operating shaft, and a connecting rod slidably mounted in said guide block, said connecting rod at one end being connected to said eccentric and at the other end to said sleeve valve.

3. An internal combustion engine, comprising a cylinder having a head, a piston reciprocable in said cylinder, a crankshaft connected to said piston, a sleeve valve mounted in said cylinder head and controlling a port for said cylinder, a valve operating shaft parallel with said crankshaft, an eccentric on said valve shaft, a guide block pivotally mounted on an axis parallel to that of said valve operating shaft, and a connecting rod slidably mounted in said guide block, said connecting rod at one end being connected to said eccentric and at the other end to said sleeve valve through a ball and socket connection.

4. An internal combustion engine, comprising a cylinder having a head, a piston, reciprocable in said cylinder, a crankshaft connected to said piston, a sleeve valve mounted in said cylinder head and controlling a port for said cylinder, a valve operating shaft parallel with said crankshaft, an eccentric on said valve shaft, a connecting rod connected at one end to said eccentric and at the other end to said sleeve valve through a universal connection, and a pivoted member supporting said connecting rod at a point between its points of attachment to said eccentric and sleeve-valve.

5. An internal combustion engine, comprising a cylinder having a head, a piston reciprocable in said cylinder, a crank shaft connected to said piston, a sleeve valve mounted in said cylinder head and controlling a port for said cylinder, a valve-operating shaft parallel with said crank shaft, and means driven from said valve shaft and operating to impart to said sleeve valve a combined movement of axial reciprocation and circumferential oscillation.

6. An internal combustion engine, comprising a cylinder having a head, a piston reciprocable in said cylinder, a crank shaft connected to said piston, a sleeve valve mounted in said cylinder head and controlling a port for said cylinder, a valve-operating shaft parallel with said crank shaft, said valve shaft having an eccentric crank coplanar with the valve-shaft axis, and means driven by said crank in the rotation of said valve-shaft to impart to a sleeve valve a movement of combined axial reciprocation and circumferential oscillation.

In witness whereof, I have hereunto set my hand at Indianapolis, Indiana, this 27th day of March, A. D. one thousand nine hundred and twenty-eight.

JULES HALTENBERGER.